United States Patent

Kantner et al.

[11] 4,078,857
[45] Mar. 14, 1978

[54] OPTICAL SYSTEM

[75] Inventors: Otto Kantner; Peter Révy von Belvárd, both of Vienna, Austria

[73] Assignees: Karl Vockenhuber; Raimund Hauser, both of Vienna, Austria

[21] Appl. No.: 703,842

[22] Filed: Jul. 9, 1976

[30] Foreign Application Priority Data

Aug. 6, 1975 Austria .................. 6078/75

[51] Int. Cl.² .................. G02B 15/14
[52] U.S. Cl. .................. 350/187
[58] Field of Search .................. 350/184, 186, 187

[56] References Cited

U.S. PATENT DOCUMENTS

| 3,391,973 | 7/1968 | Laurent | 350/186 X |
| 3,613,544 | 10/1971 | Perhal | 350/187 X |
| 3,655,271 | 4/1972 | Suzuki | 350/187 |
| 3,773,402 | 11/1973 | Gela | 350/184 |
| 3,851,952 | 12/1974 | Werz et al. | 350/187 |
| 3,884,555 | 5/1975 | Seuva et al. | 350/187 |
| 3,891,304 | 6/1975 | Muszumanski et al. | 350/184 |
| 3,970,368 | 7/1976 | Belvard | 350/187 |

FOREIGN PATENT DOCUMENTS 1,101,793  2/1959  Germany.

*Primary Examiner*—Paul A. Sacher
*Attorney, Agent, or Firm*—Fleit & Jacobson

[57] ABSTRACT

A zoom lens system having slidable lens elements wherein in a first, zoom mode a first mechanical control means is provided for moving the slidable lens elements in accordance with a first law wherein the images of different magnifications of objects lying beyond a predetermined distance from the zoom lens may be focussed in the image plane, and a second macro mode wherein mechanical means are provided for moving the movable lens elements in accordance with a second law such that images of different magnification of an object nearer to the zoom lens than the first predetermined distance may be focused in the image plane. The first and second control means, in one embodiment, are arranged and formed on a common carrier structure. Control means are provided for enabling the focal length to be varied at any of two or more macro regions or planes.

20 Claims, 33 Drawing Figures

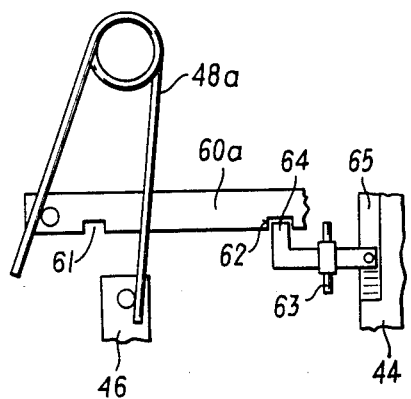
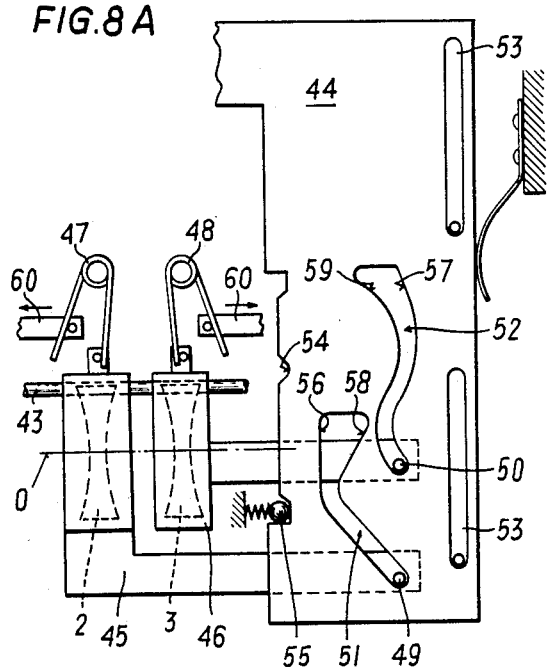
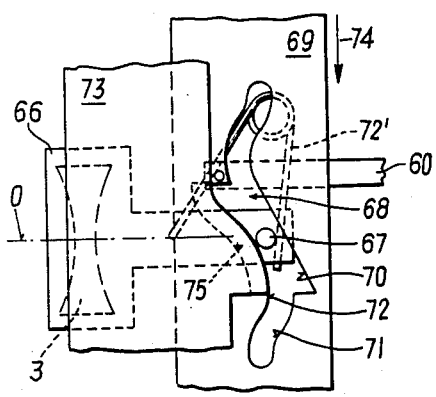
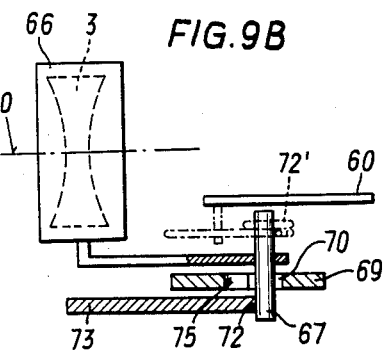
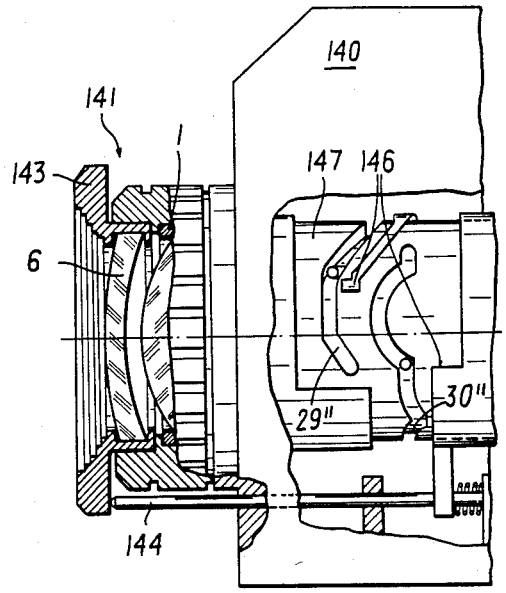

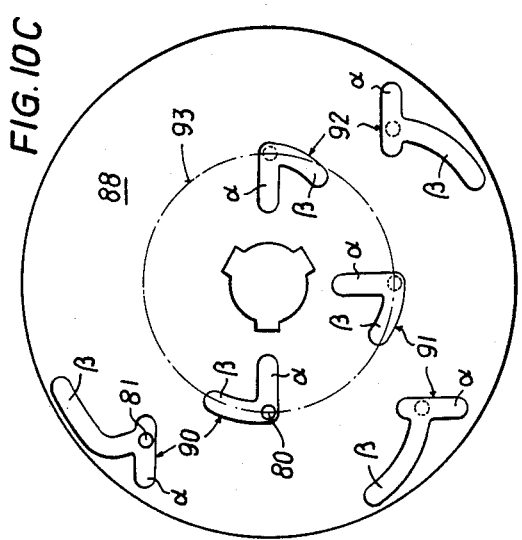
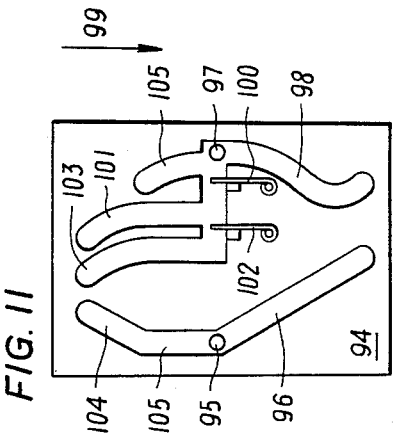
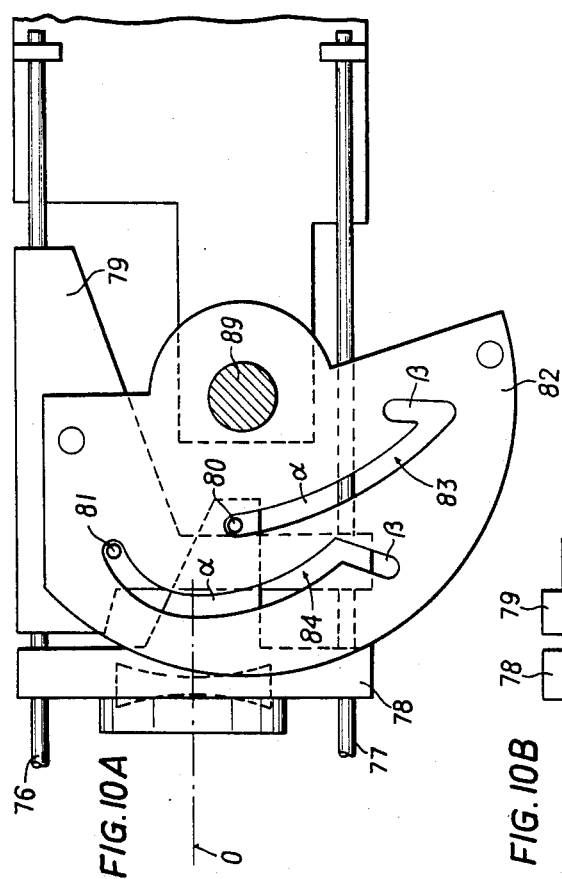
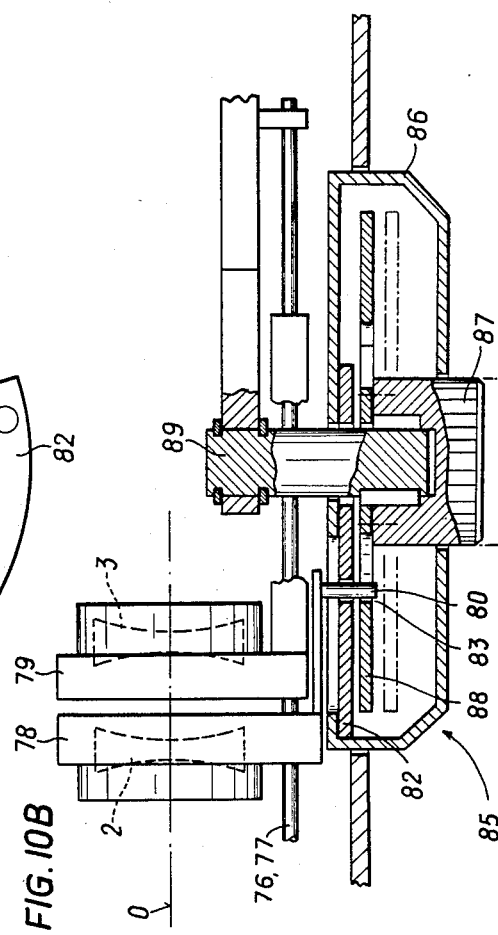

OPTICAL SYSTEM

The present invention relates to a zoom lens having at least two lens elements which are slidable along the optical axis of the lens for adjusting the focal length.

The invention is particularly applicable to a zoom lens which includes a front element of which the focal length is less than $k$-times the maximum total focal length of the zoom lens, $k$ being the ratio of the maximum total focal length to the minimum total focal length.

U.S. Pat. No. 3,655,271 discloses a photographic lens with which photographs can be taken at the "normal" distance range as well as in the macro range, i.e. at extremely short object distances, without the need for fitting supplementary lenses or the like to the main lens. When setting the system to the macro range this is made possible, in the course of adjusting the focal length of the lens, which is set to the normal distance, where appropriate to infinity, by disengaging in a specific position one of the two slidable optical elements from a sliding device so that only one optical element is adjusted. This motion enables the lens to be focussed to extremely short distances for a given focal length setting.

The German Offenlegungsschrift 2,222,411 describes a device similar to that of the above-mentioned U.S. Patent. Proceeding from the same problem, namely the sharp focussing of objects in the macro range at a fixed focal length without supplementary lenses, the lens elements of the lens which are slidable in the course of focal length adjustment are changed to different control cams in the construction disclosed in the German Offenlegungsschrift. These control cams adjust the lens elements so as to permit focussing in the macro range.

Both constructions therefore permit macro adjustment of the lens with relatively simple means. An important disadvantage of these constructions is that it is not possible to alter the focal length of the lens set to macro distance if the image location is to remain constant, in other words one cannot zoom in the macro range.

A construction of this kind which provides the amateur photographer with a variety of interesting facilities when making a film is disclosed in the German Auslegeschrift 1,101,793. This construction incorporates a cam member which is traced in all three dimensions by a complicated lever system. The lever linkage is connected to the two lenses which are slidable in the course of altering the focal length. However, this construction suffers from three important disadvantages. The first disadvantage is that the tracer which traces the shape of the cam member and transmits the motion to one of the lenses bears without guiding on the said cam member and is not subject to a fixed tracing direction. It is therefore impossible to achieve a lens motion which must be kept accurate to within 0.001 mm and is necessary for good image forming when the focal length is adjusted by driving the freely supported tracer lever if this is to remain on a fixed cam path of an infinitely large number of such cam paths on the cam member during the tracing motion. The second disadvantage is that although it is possible with difficulty to produce individual samples of such a cam member, batch production with the required accuracy is not possible in economical terms. The third and most important disadvantage is due to the fact that such a construction cannot be accommodated in a camera with reasonable dimensions, more particularly since a complex vibration-free support for the sensitivity lever drive is additionally almost certainly necessary.

The device disclosed in German Auslegeschrift 1,272,580 could be substantially simpler in mechanical terms but the literature gives no indication of a technological embodiment of the lens. The lens described in this publication comprises a front element, two central elements which are slidable for adjusting the focal length and finally one stationary fourth element. Distances are set by adjusting the second slidable element which is situated behind the front element and has a diverging action. Since the focal length of the front element is far too large for modern lenses of small physical size, it is possible to set the second element into a position in which the distance is set to infinity or by setting it into a position in which the distance setting is limited to 10cm. In these positions it is possible to alter the focal length of the entire lens, the cam characteristic by which the second element is adjusted being identical for both distance settings. However, this is possible only for the first two lens groups of a specific construction which, as already mentioned, conflicts with a modern construction. Focal length setting in the macro range is also possible only for a specific limited minimum distance.

Finally, German Auslegeschrift 2,029,254 discloses a proposal for zoom operation of a given lens without supplementary devices both in the normal distance range as well as in the macro range, but this construction suffers from the disadvantage that the image position does not remain constant when the focal length is adjusted in the macro range. It is either necessary to dispense with a sharp image, which may be deliberately desirable, for example for a "fade out" effect of a scene in the macro range or, using great effort, the image position must be manually compensated with the other slidable element.

The object of the invention is to provide a lens with the advantages of the above described known constructions but permitting in addition focal length adjustment in the simplest possible manner at any desired object distance, i.e. in the normal range as well as in the macro range.

According to the invention, there is provided a zoom lens having at least two slidable lens elements, a first mechanical control means for moving the slidable lens elements in accordance with a first law such that images of different magnification of objects lying beyond a predetermined distance from the zoom lens may be focussed in an image plane and a second, macro, mechanical control means for moving the movable lens elements in accordance with a second law such that images of different magnification of an object nearer to the zoom lens than said predetermined distance may be focussed in said image plane, the lens means being selectively controllable by said first and second control means.

The system according to the invention can be embodied only by mechanical means because of the accuracy required to transmit the control motion to the lens groups which are movable in the course of adjusting the focal length. Purely electrical control, for example by means of stepping motors or with variable potentiometers, would be far too imprecise in relation to adjusting the lens group to the appropriate position along the optical axis because the image becomes unsharp with a deviation of only approximately 0.02 mm from the calculated position.

Basically, a large number of mechanical solutions are possible for transmitting motion from the control device to the lens element, the simplest and most accurate embodiment of the control device is however obtained by camming means which can be constructed as slots or as control cams. To this end, the first control means may be provided with first focal length adjusting cams and the second control means may be provided with at least one second focal length adjusting cam, cam followers which can be engaged with the cams being associated with the slidable lens elements.

The most diverse constructions are feasible for optionally coupling the first or the second control device to the lens elements. A particularly simple embodiment is obtained by providing a cam member which couples the first focal adjustment cam to at least one of the second focal adjustment cams, one of the cam followers being advantageously positively engaged with the cams. By positively engage, it is meant that the cam follower is kept in intimate contact with the camming surface. An example of this is when the cam surface is a slot and the follower is a pin which is caused to ride in the slot. To this end, a ratchet or locking means can be provided in the region of the cam member to indicate to the operator of the apparatus that the focal length adjusting range has been traversed for normal distances thus preventing any undesired transition to the macro zoom range.

These locking means could be controlled by a mode selector switch.

A particularly advantageous solution to the problem of the invention is obtained if a supplementary device is arranged in front of the lens. The said supplementary device could comprise a transparency holder or a lens element with extremely negative-refraction to obtain a wide-angle effect. In the first case the transparency would have to be positioned in the plane which is also associated with the macro zoom cam and in the second case an intermediate image of the negative lens element would have to be situated in the said plane so that a sharp image of the transparency or of the intermediate image can be obtained for all focal length settings in both cases. Changeover of the slidable lens elements from the normal focal length adjusting cam to the macro zoom cam could be controlled by tracing means disposed in the region of an exposure device on the lens for the supplementary device. Locking means are proposed in another embodiment of the invention to prevent the attachment of the supplementary device into the exposure device unless the cam follower or followers for controlling the slidable lens elements are set on the control cam associated with the transparency distance or intermediate image distance when focal lengths are adjusted in the macro range.

Tensionally tracing of the cam characteristic by the cam follower is suitable if the focal length adjusting cam for the normal distance range and for the macro range take the form of boundary surfaces in a recess of the cam support. Non-positive tracing, of course, means that the cam follower is not always maintained in intimate contact with the camming surface and in fact may be lifted off the cam surface at various times during the operation. The cam follower can be changed from one focal length adjusting cam to the other by means of a spring, for example a torsion spring, whose direction of force is reversible. However, it is also feasible to arrange a second cam support above the first cam support, the cam of the second cam support lifting the cam follower from a focal length adjusting cam when the two supports are in a specific relative position, thus providing engagement with its own focal length adjusting cam.

The invention will now be described further, by way of example, with reference to the accompanying drawings, in which:

FIGS. 1, 2A–2F, 3, and 4A–4G show two possible embodiments of lenses to which the invention can be advantageously applied.

FIGS. 8A and 8B show details of a focal length adjusting device for the two slidable elements of a zoom lens.

Figures 12A, 12B:
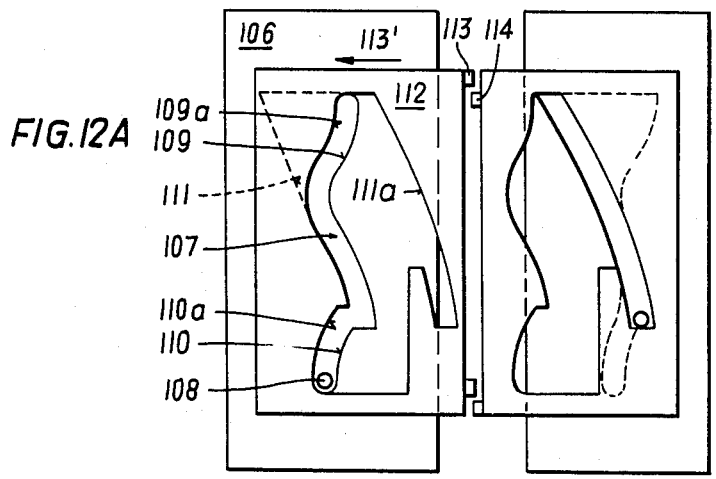
Figure 15:
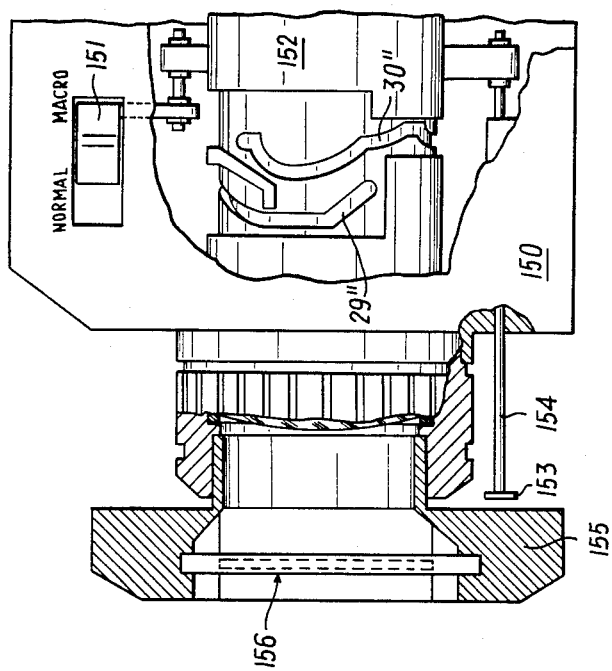
Figure 13A:
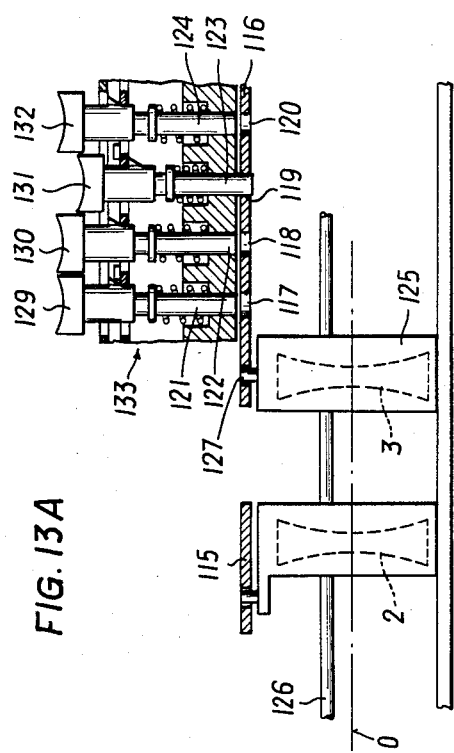
Figure 13B:
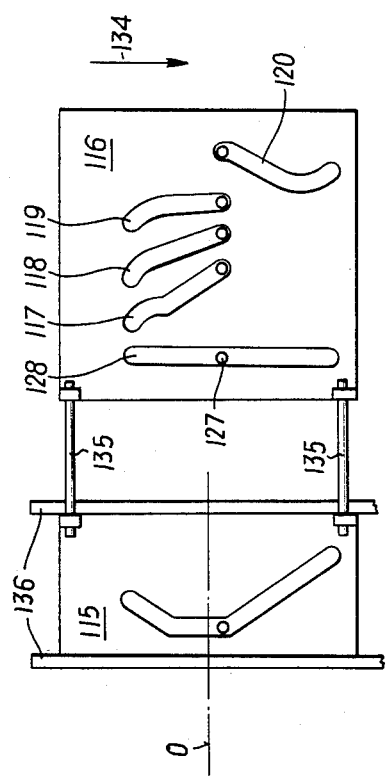

FIGS. 9A and 9B show an arrangement for transmitting motion by non-positive means, FIGS. 10A to 10C show an arrangement for transmitting motion by positive means, allowing for focal length adjustment over several planes in the macro range, FIG. 11 also shows an arrangement offering this facility but with a different locking device or cam system, FIGS. 12A, 12B show positive guiding means for the cam follower with cam supports situated in different planes, FIGS. 13A and 13B shown an embodiment with several cam followers for the second focal length adjusting cam or for different macro zoom ranges, and FIGS. 14 and 15 show a camera with a supplementary unit, for example a transparency holder or wide-angle attachment, fitted to the lens, the focal length adjustment being controlled in dependence of the said supplementary device.

Figure 1:
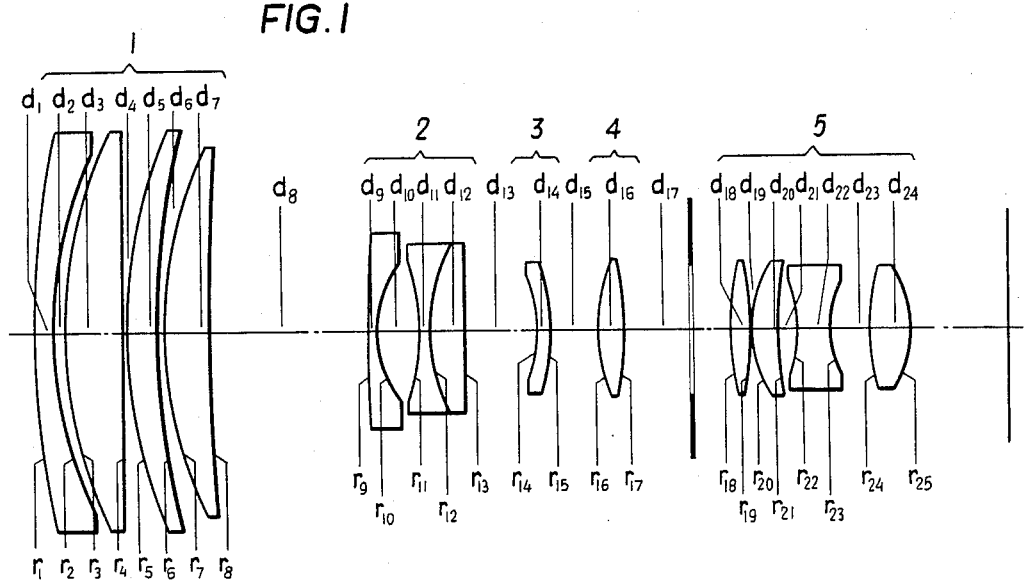

FIG. 1 shows a zoom lens designed particularly for the Super 8 film format. The Table below describes an embodiment of the lens where $r$ refers to the radii, $d$ to the vertex distances, $n_d$ to the refractive indices and $v_d$ to the Abbe numbers.

| | | | $n_d$ | $v_d$ |
|---|---|---|---|---|
| $r_1 + 6.308$ | | | | |
| | $d_1 =$ | 0.07 | 1.805 / | 25.4 |
| $r_2 + 1.976$ | | | | |
| | $d_2 =$ | 0.06 | | |
| $r_3 + 2.082$ | | | | |
| | $d_3 =$ | 0.26 | 1.620 / | 60.3 |
| $r_4$ plan | | | | |
| | $d_4 =$ | 0.01 | | |
| $r_5 + 2.341$ | | | | |
| | $d_5 =$ | 0.15 | 1.623 / | 58.1 |
| $r_6 + 4.961$ | | | | |
| | $d_6 =$ | 0.01 | | |
| $r_7 + 1.805$ | | | | |
| | $d_7 =$ | 0.22 | 1.623 / | 58.1 |
| $r_8 + 12.664$ | | | | |
| | $d_8$ | 0.04 $f_{min}$<br>0.69 $f_M$<br>1.03 $f_{max}$ | | |
| $r_9 + 5.981$ | | | | |
| | $d_9 =$ | 0.05 | 1.658 / | 50.9 |
| $r_{10} + 0.567$ | | | | |
| | $d_{10} =$ | 0.16 | | |
| $r_{11} - 1.086$ | | | | |
| | $d_{11} =$ | 0.05 | 1.669 / | 57.4 |
| $r_{12} + 0.652$ | | | | |
| | $d_{12} =$ | 0.15 | 1.805 / | 25.4 |
| $r_{13} + 7.039$ | | | | |
| | $d_{13}$ | 1.09 $f_{min}$<br>0.32 $f_M$<br>0.14 $f_{max}$ | | |
| $r_{14} - 0.639$ | | | | |
| | $d_{14} =$ | 0.05 | 1.624 / | 47.0 |

-continued

| | | | | $n_d$ | $v_d$ |
|---|---|---|---|---|---|
| $r_{15} - 1.288$ | | | | | |
| | $d_{15}$ | 0.10 | $f_{min}$ | | |
| | | 0.22 | $f_M$ | | |
| | | 0.06 | $f_{max}$ | | |
| $r_{16} + 1.097$ | | | | | |
| | $d_{16} =$ | 0.10 | | 1.691 / | 54.7 |
| $r_{17} - 3.661$ | | | | | |
| | $d_{17} =$ | 0.46 | | | |
| $r_{18} + 2.052$ | | | | | |
| | $d_{18} =$ | 0.10 | | 1.620 / | 60.3 |
| $r_{19} - 2.052$ | | | | | |
| | $d_{19} =$ | 0.01 | | | |
| $r_{20} + 0.686$ | | | | | |
| | $d_{20} =$ | 0.13 | | 1.717 / | 48.0 |
| $r_{21} + 26.527$ | | | | | |
| | $d_{21} =$ | 0.04 | | | |
| $r_{22} - 0.848$ | | | | | |
| | $d_{22} =$ | 0.16 | | 1.785 / | 26.1 |
| $r_{23} + 0.535$ | | | | | |
| | $d_{23} =$ | 0.18 | | | |
| $r_{24} + 1.614$ | | | | | |
| | $d_{24} =$ | 0.19 | | 1.720 / | 50.4 |
| $r_{25} - 0.639$ | | | | | |
| | $f_{min} =$ | 0.43 | | | |
| | $f_M =$ | 1.00 | | | |
| | $f_{max} =$ | 2.03 | | | |
| | $2'y =$ | 0.37 | | | |

Relative aperture ratio 1:1.9

The lens comprises a stationary positive element 1 nearest to the object, a negative element 2 situated behind the element 1 and being slidable along the optical axis for the purpose of altering the overall focal length, a negative element 3 which is slidable along the optical axis to maintain a constant image position and a stationary positive element 4 which converges the pencil of rays diverting behind the element 3 so that they proceed axially parallel in the diaphragm space between the above-mentioned element 4 and a positive base lens 5 which is also stationary.

Figure 2A:
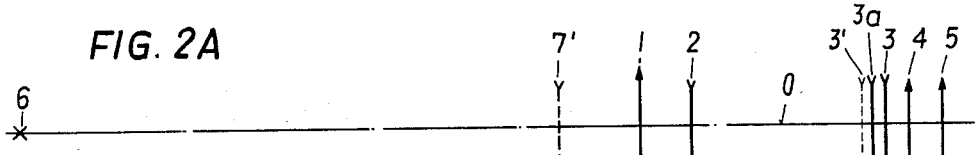
Figure 2B:
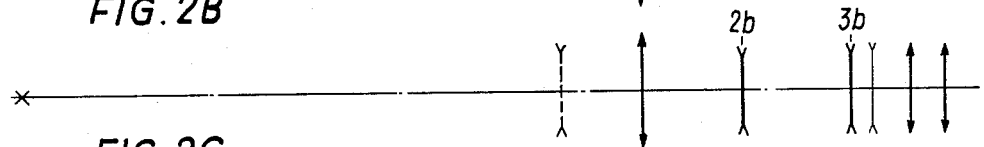
Figure 2C:
Figure 2D:
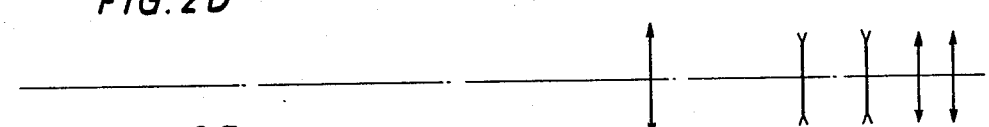
Figure 2E:
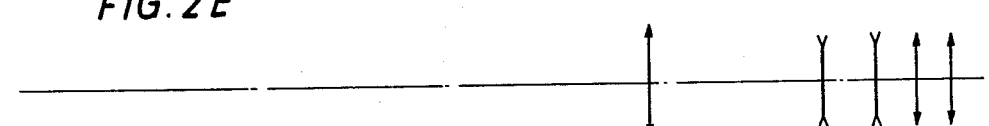
Figure 2F:
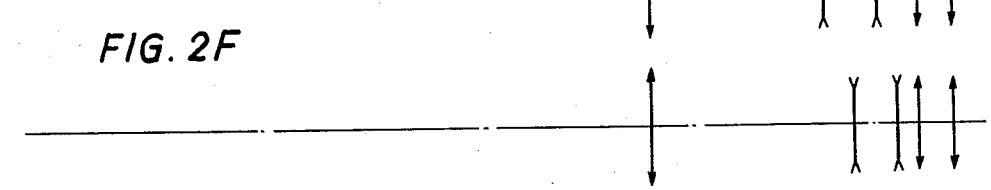

FIG. 2A shows the wide-angle position of the lens, FIGS. 2D and 2E showing middle focal length settings, FIG. 2F showing the maximum focal length setting, the individual elements being shown as lenses which are infinitely thin. Focussing of an object situated in the extreme macro range is not only made possible in the setting for minimum overall focal length, but also in every other focal length setting, by sliding the element 3 into the position 3' while the other elements remain in the same position. The construction of the lens therefore complies with the prior art and is disclosed, for example in the Austrian Patent Specification 317,576.

As already mentioned, the focal length is to be additionally adjustable in the said macro range while the image position is to remain constant. This is made possible by initially setting the element 3 towards the element 2, for example in position 3a. In this position the entire lens is focussed on an object plane 6 which is situated in the macro range and the lens will have a focal length of $f = 0.28$. To increase the aspect ratio for the object situated in the plane 6, the elements 2 and 3 are moved into the positions marked with the index b, c in FIGS. 2B and 2C, the element 2 traversing through part of the distance which it would traverse in normal adjustment of the focal length. The focal length adjustment range for macro exposures was terminated in position c because the movement of the element 3, which increases steeply towards the front, would cause the said element to move into the path of the element 2. Overlapping of the movements of elements 2 and 3 would occur even earlier if the objects were set at the extreme macro distance (position 3' of the element 3). The pitch of the cam for the element 3 however depends merely on the individual focal lengths of the lens elements and can yield an optimum focal length range if suitably selected. A lens of proven practical performance was deliberately selected in the present case to indicate that the invention can be advantageously employed with any desired lens and not one that is a special embodiment.

The focal length of the lens in position c is 0.43 and thus adjoins directly on the minimum total focal length of the lens with a normal distance setting. However, as will be described subsequently by reference to FIG. 4, it is possible to increase the zoom ratio for macro exposures despite the rapid rise in the adjustment for the element 3.

FIG. 2A shows a particularly advantageous embodiment of the invention, namely a negative element 7' which is illustrated in broken lines. The said element 7' can be arranged in front of the complete lens 1 – 5, to achieve an extreme wide-angle effect for the normal distance range in the macro setting of the lens to the plane 6. The effect is based on the special construction of the element 7', the intermediate image plane of which must coincide with the plane 6. In the example illustrated in FIG. 2A, the focal length of the element 7' is -3.48 referred to a mean total focal length of the lens 1 – 5 of 1.0.

Figure 3:
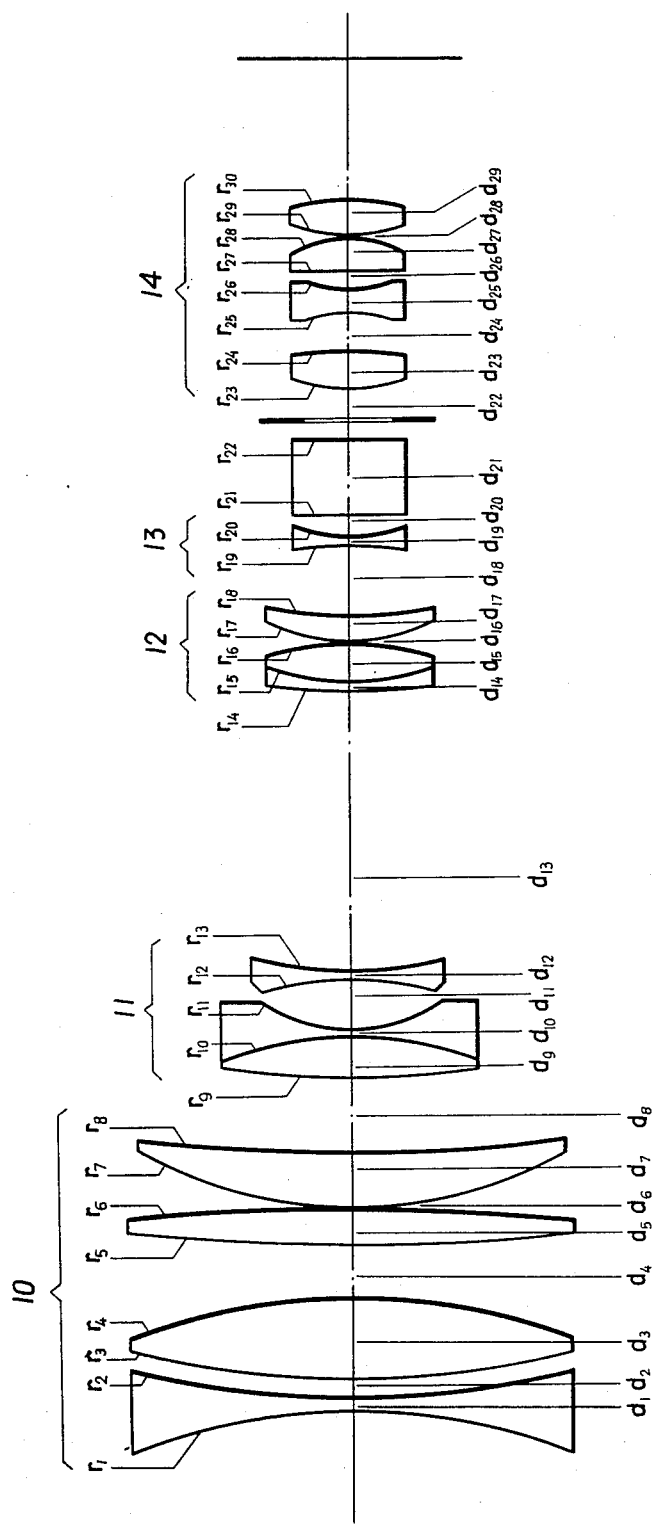

FIG. 3 also shows a zoom lens but of a different kind to that of FIG. 1. This lens incorporates a positive front element 10 (see also FIG. 4), a slidable negative element 11 in second place, a third slidable positive element 12 and a fourth negative element 13. The element 13 is followed by a positive base lens 14. Data for such a lens may be obtained from the Table below in which r again refers to the radii, d to the vertex distances and $n_d$ to the refractive indices and $v_d$ to the Abbe numbers.

| | | | $n_d$ | $v_d$ |
|---|---|---|---|---|
| $r_1 - 67.2$ | | | | |
| | $d_1 =$ | 1.9 / | 1.805 | 25.4 |
| $r_2 + 105$ | | | | |
| | $d_2 =$ | 1.9 | | |
| $r_3 + 116$ | | | | |
| | $d_3 =$ | 8.3 / | 1.574 | 56.4 |
| $r_4 - 60.8$ | | | | |
| | $d_4 =$ | 4.9 | | |
| $r_5 + 187$ | | | | |
| | $d_5 =$ | 4.4 / | 1.643 | 48.0 |
| $r_6 - 187$ | | | | |
| | $d_6 =$ | 0.1 | | |
| $r_7 + 45.4$ | | | | |
| | $d_7 =$ | 5.7 / | 1.656 | 50.9 |
| $r_8 + 166$ | | | | |
| | $d_8 =$ | 0.8 — | 29.3 | |
| $r_9 + 93.2$ | | | | |
| | $d_9 =$ | 3.8 / | 1.805 | 25.4 |
| $r_{10} - 52.2$ | | | | |
| | $d_{10} =$ | 1.0 / | 1.620 | 60.3 |
| $r_{11} + 16.6$ | | | | |
| | $d_{11} =$ | 4.9 | | |
| $r_{12} - 37.9$ | | | | |
| | $d_{12} =$ | 1.0 / | 1.744 | 44.8 |
| $r_{13} + 41.2$ | | | | |
| | $d_{13} =$ | 41.8 — | 2.0 | |
| $r_{14} + 77.7$ | | | | |
| | $d_{14} =$ | 0.8 / | 1.741 | 27.6 |
| $r_{15} + 30.0$ | | | | |
| | $d_{15} =$ | 3.8 / | 1.652 | 44.9 |
| $r_{16} - 30.0$ | | | | |
| | $d_{16} =$ | 0.1 | | |
| $r_{17} + 19.9$ | | | | |
| | $d_{17} =$ | 2.7 / | 1.720 | 50.4 |
| $r_{18} + 78.2$ | | | | |
| | $d_{18} =$ | 2.8 — | 14.1 | |
| $r_{19} - 41.1$ | | | | |
| | $d_{19} =$ | 0.9 / | 1.620 | 60.3 |
| $r_{20} + 17.4$ | | | | |
| | $d_{20} =$ | 1.9 | | |
| $r_{21} \infty$ | | | | |
| | $d_{21} =$ | 8.2 / | 1.569 | 56.1 |
| $r_{22} \infty$ | | | | |

-continued

|  | $d_{22} =$ | 5.05 | $n_d$ | $v_d$ |
|---|---|---|---|---|
| $r_{23} + 17.8$ | $d_{23} =$ | 4.2 / | 1.570 | 49.5 |
| $r_{24} - 49.7$ | $d_{24} =$ | 3.5 | | |
| $r_{25} - 16.5$ | $d_{25} =$ | 2.4 / | 1.847 | 23.8 |
| $r_{26} + 16.5$ | $d_{26} =$ | 1.35 | | |
| $r_{27} - 585$ | $d_{27} =$ | 3.8 / | 1.569 | 63.1 |
| $r_{28} - 12.4$ | $d_{28} =$ | 0.2 | | |
| $r_{29} + 18.9$ | $d_{29} =$ | 3.1 / | 1.620 | 60.3 |
| $r_{30} - 23.3$ | | | | |

Figure 4:
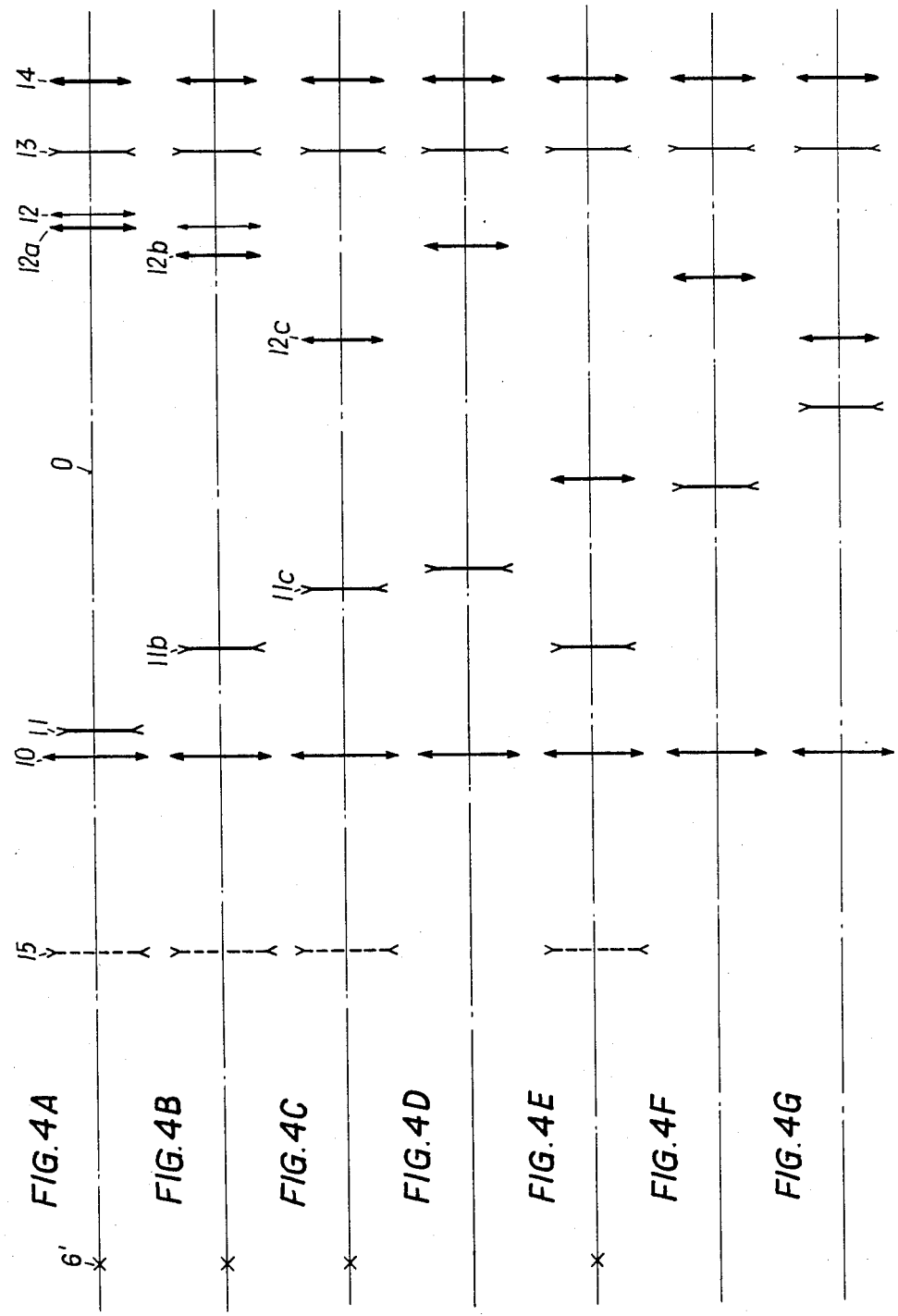

This lens, which is disclosed in the Austrian Patent Specification 291,619, is diagrammatically illustrated in FIG. 4 by lenses which are infinitely thin, FIG. 4A representing the wide-angle position, FIG. 4G the teleposition of the lens and FIGS. 4D and 4F showing medium focal settings for the normal distance range.

By adjusting the element 12 into the position 12a the lens is focused to the plane 15 in the macro range. If the focal length is to be adjusted with a constant image position, proceeding from the setting which is focused to the plane 15, the element 11 will take up the positions 11b, 11c with progressive adjustment and the element 12 will take up positions 12b and 12c. In FIG. 4C, the image ratio is 1 : 1 due to the element 12. The direction of motion of the element 11 is reversed in FIG. 4E and the element 12 is moved to the front more steeply to obtain a further increase of the zoom ratio without encountering mechanical difficulties in socketing and guiding the moving lens elements 11 and 12. In this position the focal length is 12.07 and therefore already extends far into the normal focal length adjusting range from 7.28 to 55.46. The focal length of 12.07 can be increased still further by a distributed construction of the control cams for the elements 11 and 12, for example on two different supports, the elements 11 and 12 then moving toward the front element 10.

Zooming with this lens is possible not only in the macro range, but the wide-angle range can be increased to an extreme degree by the addition of a negative element 15 — similar to the procedure described by reference to FIG. 2. The element 15 has an assumed focal length of −28.38. In the present exemplified embodiment the zooming ratio which can be achieved by the invention extends down to 3.48 to produce an image angle of approximately 90° by attaching the element 15 in front of the front element 10 by means which can be easily constructed.

Figure 5:
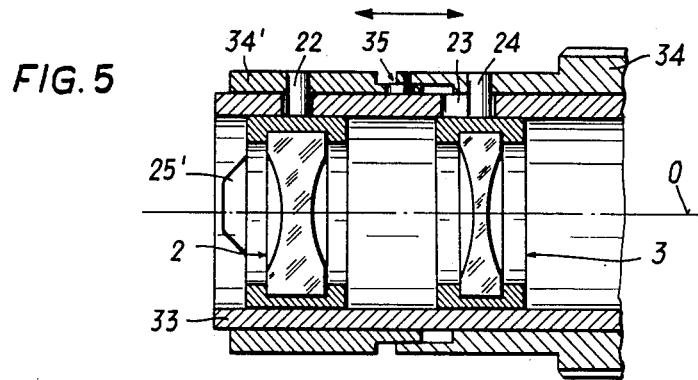
FIG. 5 shows a basic embodiment for a sliding device.

FIG. 5 shows a lens mount for the elements 2 and 3 of the lens according to the invention, the drive for the adjusting motion being applied to the cam support which is constructed as a tube 33 and incorporates a control cam 25' from FIG. 7A to be described subsequently, for example for the element 2, and a cam slot 23 from FIG. 6 for the element 3. An operating handle 34 is rotated for adjusting the focal length. Cam followers 22, 24 are supported in the tubular handle and are entrained in the course of rotation, the elements 2, 3 sliding along the optical axis 0 of the lens is accordance with the shape of the control cam.

When the follower 24 is set to the second cam in the slot 23 for controlling the focal length adjustment in the macro range the element 3 also performs the focusing motion for the object plane in the macro range associated with the second focal length adjusting cam while the element 2 remains stationary. In mechanical terms this is achieved by the operating tube 34 being constructed in two parts, the part 34' which supports the follower 22 for the element 2 remaining stationary by virtue of the pin-slot guide 35. The pin of this guide 35 entrains the part 34' only when the handle 34 is rotated. The follower 24 can be driven into its two positions by means of a changeover spring which applies a load to one of the two flanks of the control slot 23.

Figure 6:
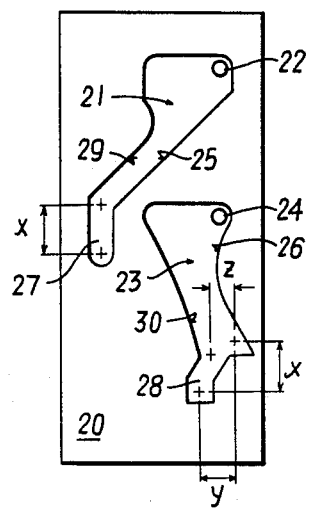
FIGS. 6, 7A and 7B show possible arrangements of focal length adjustment cams on cam supports.
Figure 7A:
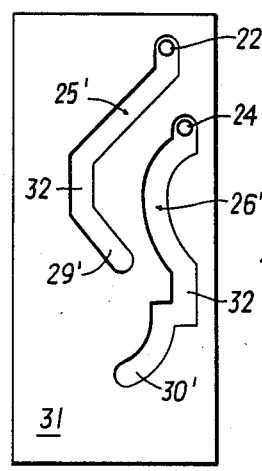
Figure 7B:
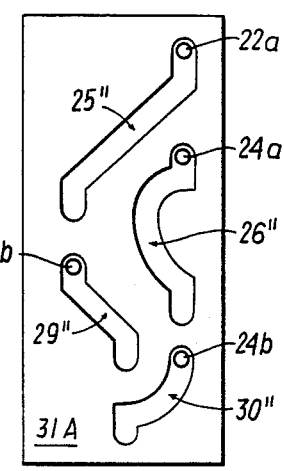

Embodiments showing the arrangement of the control cams on a cam support are diagrammatically illustrated in FIGS. 6, 7A and 7B. The embodiment illustrated in FIG. 6 shows a cam support 20 with control cams, for example for the lens illustrated in FIGS. 1 and 2. The said cam support 20 can be constructed as tube and is shown in developed form in FIG. 6. One cam slot 21 is associated with a cam follower 22, connected to the element 2, and one cam slot 23 is associated with a cam follower 24 of the element 3.

When the focal length is adjusted in the normal distance range the cam follower 22 bears non-positively upon the cam slot boundary 25 and the follower 24 bears non-positively upon the cam 26. The facilities for controlling the cam follower when this engages with the cams will be described subsequently. The construction or shape of the cams 25 and 26 is known and it is therefore not necessary to describe in detail the relative positions of cams and cam followers.

On the side of the lens corresponding to the wide-angle position the slots 21 and 23 have extensions 27, 28 of a length x for focusing the lens in the macro range. The cam follower 22 does not alter its relative position in the extension 27 along the optical axis of the lens but the element 3 is displaced by the amount "y" parallel to the optical axis by means of the follower 24 moving in extension 28. The amount "y" corresponds to the distance through which the element 3 slides into the position 3' (see also FIG. 2A). If zooming is to be performed in the macro range in accordance with the invention the cam followers 22, 24 are applied to the left-hand flank of the control slot 21 or 23, with reference to FIG. 6. These flanks are constructed as the focal length adjusting cams 29, 30 for an object situated at a macro distance defined by the traversing distance "z" of the follower 24. In the course of adjusting the focal length the element 3 which is driven by the cam follower 24 moves progressively towards the element 2 while the cam 29 for the element 2 has a point of reversal at a magnification $\beta = 1$ through the lens 3 in the direction of motion in order to increase the zooming ratio (in a manner similar to that described by reference to FIG. 4).

The position of the cam followers 22 and 24 illustrated in FIG. 6 is not equivalent to the position of the mounts for the lens elements which are to be controlled because the transmission means between the cam followers and the lens mounts are not shown in the interests of clarity.

FIG. 7A shows a cam support 31 in which the operation of tracing by means of the cam followers 22 and 24 is performed in positive manner. The cams 25', 26' extend over a first range of the support. The ends of the cams are provided with a cam member 32 which changes over the cam followers 22, 24 from the focal length adjusting cams 25', 26' associated with the normal distance range to the focal length adjusting cams 29', 30', for a specific object plane in the macro range.

FIG. 7B shows another method of constructing a cam support 31A. In this case the cams 25", 29" or the cams 26", 30" are separate, each of the lens elements 2 and 3 being associated with two cam followers 22a, 22b or 24a and 24b respectively. In this embodiment the cam followers 22a, 24a or 22b, 24b must be capable of being alternately switched to the lenses 2, 3.

FIG. 8A shows a cam support 44 constructed in flat form. The elements 2, 3 are supported in mounts 45 or 46 which can slide along a column 43. Each of the mounts or their cam followers 49, 50 are biased to the appropriate focal length adjusting cams by a torsion spring 47 or 48 whose direction of force is reversible. The focal length adjusting cams are constructed as the boundary surfaces of control slots 51, 52. The support 44 with the control slots can slide transversely to the optical axis 0 along pinslot guides 53, the shape of the control cams in the slots converting the said sliding motion into a motion along the optical axis towards the mounts 45, 46. The focal length adjustment for the normal range is limited by a recess 54 on the support 44.

If focussing is desired in the macro range of this system, adjustment of the carrier merely requires overcoming the spring force of the ball catch 55 to enable the cam follower to bear upon the cam sections 56 or 57 while the direction of the spring force 47, 48 remains the same.

The cam followers must bear upon the cam sections 58, 59 if the focal length is to be adjusted at a specific macro distance. This is achieved by changing the control levers 60 into the illustrated arrow direction. The changeover can be effected after the ball catch 55 has engaged the recess 54.

Locking means illustrated in FIG. 8B for the operation of the changeover lever 60 is provided to prevent any changeover of the cam followers to the macro focussing cam in the macro zooming range. Only one of the levers is shown in the interest of simplicity. The said lever 60a has two recesses 61, 62 which co-operate with a pawl 64 that can pivot about an axis 63. Pivoting about the axis 63 drives an axial cam 65 on the carrier 44.

The method of operation of the locking means is as follows. In the position illustrated in FIG. 8B, the spring 48a biases the mount 46 or its cam follower 50 upon the cam 59 of the control slot 52. The axial cam 65, which is raised with respect to the carrier 44, incorporates a ramp when the ball 55 drops into the recess 54. This occurs when the cam follower 49, 50 merges into the expanded control slot region. The pawl 64 which is driven by the cam 65 pivots about the axis 63 and drops into the recess 62. The lever 60a is therefore locked against any changeover of the spring 48a for the entire tracing range of the cam 59.

Changeover of the direction of spring force is not possible in the region of the control slot 52 since the pawl 64, driven by a cam which corresponds to the cam 65, can drop into a recess 61 in which position of the lever the follower 50 bears upon the cam 57 (macro focussing).

One embodiment of the invention in which the focal length setting can be controlled in several macro distances is shown in FIGS. 9A and 9B. The lens 3 is accommodated in a mount 66. The mount is provided in known manner with a cam follower 67. In the course of the tracing motion of the cam follower 67 with respect to various control cams in a control slot 68 of a support 69 the lens 3 is moved along the optical axis 0 in accordance with laws which are specific to the control cams.

The control slot 68 has at least one cam section 70 which drives the lens 3 for zooming over the normal distance range. Another cam section 71 is allocated to focussing in the macro region. A spring 72', whose direction of force is reversible, switches the cam follower 67 to the cams 70 or 71 respectively in a manner similar to that of the device illustrated in FIG. 8. In the position illustrated in FIG. 9A the cam follower 67 is biased towards a control cam 72 which is disposed on another carrier 73. The carrier 73 by itself can be adjusted parallel to the optical axis 0 for preselecting the focal length control cams, namely by a changeover device not shown in detail, and can be adjusted in the direction of the arrow 74 together with the carrier 69 by a focal length adjusting device which is not shown. The control cam 72 directly adjoins one end of the macro focussing cam 71 and is thus allocated to focal length adjustments at the macro distance which corresponds to focusing at this ends of the macro cam 71. If the support 73 is moved to the left — with reference to FIG. 9A — the spring 72' will urge the cam follower 76 to another focal length adjusting cam 75 in the control slot 68 for another specific macro distance. Focal length adjustment for the normal distance range, focusing in the macro range and focal length adjustment for objects situated in two different planes in the macro range is thus possible with relatively simple means of construction.

One embodiment of the invention in which any desired number of focal length adjustment curves associated with specific planes in the macro range can be used for control purposes and is shown in FIG. 10A to C.

Two mount parts 78, 79 for the lenses 2, 3 are guided parallel to the optical axis 0 on stationary guide columns 76, 77. To control the adjusting motion along the optical axis the mount 78 supports a cam follower 80 and the mount 79 supports a cam follower 81. Both cam follower 80, 81 are guided in control cams of a disc cam 82. The cam 83 associated with the cam follower 80 and the cam 84 associated with the cam follower 81 have a section $\alpha$ which is associated with focal length adjustment in the normal distance range. In the course of adjusting the focal length in the macro range, the cam followers 80, 81 traverse through the section $\beta$ of both cams. A focal length adjusting device 85, comprising an operating handle 86 and an operating handle 87 (FIG. 10B) is provided for transmitting the shape of the control cams to the cam followers. The handle 86 supports the disc cam 82, a further disc cam 88 being mounted on the operating handle 87. Both disc cams together with their handles can be independently rotated about a stationary axis 89. As can be seen by reference to FIG. 10C, the disc cam 88 is provided with several spline grooves so that one of three pairs of cams for the macro adjustment of the lenses 2 and 3 can engage in a specific angular position with the cam follower 80, 81 which are mounted on the spindle 89.

The disc cam 88 assumes the position shown in broken lines in FIG. 10B for adjusting the focal length in the normal distance range, neither of the two cam followers being able to engage with the cams of the disc cam 88. The lenses 2 and 3 are therefore driven merely by the cams 83, 84 through the range $\alpha$. The transition angle to the section $\beta$ is so acute that rotation of the handle 86 or of the disc cam 82 beyond the $\alpha$ region results in self-locking action.

If the operating handle 87 together with the disc 88 is then moved into the position shown in solid lines in FIG. 10B, one of the cam pairs 90, 91 or 92 will engage with the associated cam follower 80 or 81. All cams of the disc 88 have cut-outs to permit free motion of the cam followers 80, 81 for focal length adjustments over the normal distance range $a$. This can be effected solely by clockwise rotation of the handle 87 or of the disc cam 88 associated therewith with reference to FIGS. 10A and C — the cam followers bearing on the appropriate underside of the cam and being deflected laterally in dependence on the shape of the cams 83, 84 which are situated beneath. To effect the adjustment, it is necessary that the cam followers are situated in the transition of the regions $a$ and $\beta$ — with reference to cams 83 and 84 — at the beginning of the adjusting motion.

If the disc arm 88 is rotated in the clockwise direction proceeding from this position, it results in a focal length adjusting motion of the lenses 2 and 3 in terms of forming an image of an object in the macro region with a constant image position. In this case the cam followers 80, 81 will move in accordance with laws defined by the cam regions $\beta$ of the cams 91 or 92.

The circular middle line 93 illustrated in FIG. 10C discloses that with the exception of the cam 90 the cams associated with the cam follower 80 for the element 2 have an inwardly extending characteristic. This means that the cams 91, 92 control focal length adjustment in the macro region while the circular cam 90 does not result in any axial adjustment of the element 3 and therefore controls macro focusing accompanied by simultaneous adjustment of the element 3. The cams 91 and 92 are focal length adjustment cams for different macro distances. The effect of fading out in the form of dissolving the image sharpness can also be achieved by the above-described facility of changing directly from the focal length adjustment for the macro range or macro focusing cam into the normal focal length adjustment cam. This device also permits zooming in other macro distances, in which case the disc 88 must be exchanged for another disc with further cams 91, 92 which correspond to the focal length adjustment cams.

FIG. 11 shows another possible embodiment of a cam support with focal length adjustment cams which are positively traced for several macro distances. All cams of this embodiment are disposed on a single support 94. One cam follower 95 is associated with the element 2 and is guided in a slot 96. One follower 97 is associated with the element 3 and is guided in a slot 98 for adjusting the focal length over the normal distance range. Altering the focal length results in the support 94 being adjusted in the direction of the arrow 99.

The changeover of the focal length range for normal distances to macro distances is obtained by adjustment of the cam follower 97 to the left, with reference to FIG. 11. To this end, the locking device 100 for a focal length adjusting cam 101 or the said locking device 100 and a further locking device 102 for the focal length adjusting cam 103 must first be released. The method of controlling the locking device will be described subsequently.

The cams 101 and 103 for the element 3 are associated to different planes in the macro range, the element 2' moving towards the element 3 due to being driven by the cam follower 95 and the cam section 104. The support 94 also has a cam section 105 for controlling focusing in the macro range.

A support illustrated in FIGS. 12A and B represents an embodiment according to the present invention in which two separate but positively engaged cam carriers are provided. Such support has a cam slot 107 in which a cam follower 108 is positively guided. The cam slot is defined by three cam sections which control different settings of the lens which is not shown in the interests of simplicity. The cam section 109 controls the motion of the cam follower 108 for normal focal length adjustment, the cam section 110 provides this control for macro focusing and the cam section 111 provides this control for focal length adjustment in the macro range.

A further cam support 112, which is adjustable with the support 106 in the control direction for the cam follower 108 but can be adjusted in the direction of the arrow 113' when changing over the adjusting facilities of the lens, is also provided since, as already mentioned, the cam follower 108 is to be positively guided. The support 112 incorporate cams 109$a$ to 111$a$ which are parallel to the cams 109 to 111. A specific path for the cam follower is thus released in dependence on the lateral position of the support 112 in relation to the support 106. According to FIG. 12A it is possible to adjust the focal length over the normal distance range and to obtain focusing in the marco range. The focal length adjusting cam for the marco range is released in FIG. 12B. Stop abutments, which limit the lateral adjusting travel of the support 106 so that the cam slot generated thereby corresponds to the diameter of the cam follower 108, are designated with the numerals 113 and 114.

One embodiment in which several cam followers are provided for controlling an adjustable optical elements is shown in FIGS. 13A and 13B. Controlling the element 2 by means of cam supports 115 has already been described in similar exemplified embodiments but the lens element 3 is associated with a cam support 116 which supports four cams 117 to 120 each of which can be brought into engagement with a cam follower 121 to 124. A mount 125 for the lens element 3 is guided along the optical axis 0 by means of a column 126 and supports a pin 127 which is inserted into the support 116 and is guided in a guide slot 128 (FIG. 13B).

The cam followers 121 to 124 support operating buttons 129 to 132 each of which is associated with a known ratchet device 133 so that only one of the cam followers can be engaged with the cam associated therewith.

The cam followers 121 to 124 are stationarily supported while the support 116 can be adjusted relative to the cam followers in the direction of the arrow 134 (FIG. 13B). In the illustrated example, the cam follower 123 is in engagement with the cam 119 associated therewith. The cams 117 to 119 control the adjustment of focal length in the marco range.

In the course of the adjusting motion of the support 116 the support 115 is entrained in the same direction by means of the guide rod 135 but the rails 136 prevent adjustment of the support 115 in the direction of the optical axis 0 while the support 116 can be adjusted along the rods 135 in the direction of the optical axis, namely in dependence on the shape of the cam 117 to 120 which is being traced. In the course of the adjusting motion the pin 127 of the mount 125 slides in the slot 128. Advantageously, the operating handle for adjustment in the direction of the arrow 134 acts on the guided support 115.

FIGS. 14 and 15 show a particularly advantageous embodiment of the apparatus according to the invention for cine cameras. A wide-angle supplementary unit 141 can be fitted in front of the front element 1 of a cine camera 140 part of which is shown in FIG. 14. The wide-angle supplementary lens comprises the negative element 6 (see FIG. 2) which is supported in a mount 143 that can be fitted upon a camera lens mount 142.

Fitting the supplementary wide-angle lens 141 displaces a tractor rod 144 which thus releases a locking device 146. The locking device is constructed in tubular form and extends over the actual focal length cam tube 147, which can be constructed, for example in the same way as the tube 31 of FIG. 5B. Displacement of the locking tube 146 in relation to the cam tube 147 releases the cam sections 29" and 30" for adjusting the focal length in the marco range, the intermediate image situated in the marco range being sharply focused by means of the negative lens 6. The strongly divergent action of the lens 6 will then provide the extreme wide-angle effect. The locking devices 100, 102 of FIG. 11 can be controlled by the tracer rod 144 in place of the locking tube 147.

FIG. 15 shows a similar embodiment of the invention for a cine camera 150. Operation of a marco button 151 causes a similarly constructed locking tube 152 to be moved into the illustrated position so that the cam sections 29" and 30" are released for adjusting the focal length in the marco range. At the same time, a locking nose 153 is adjusted by a rod 154, associated with the tube 152, from the region of the leading front of the lens 142 so that a transparency holder 155 can be placed in front of the front element 1. The transparency 156 which is inserted into the transparency holder is situated accurately at the distance from the front lens 1 with which the marco focal length adjusting cams 29", 30" are also associated. If several such zoom cams are provided, it is possible to switch the locking nose 153 in the position which will only permit the supplementary device to be fitted which is associated with the selected focal length adjusting cam.

The device according to the invention is not confined to its application in cine cameras, but can be used generally for all zoom lenses, for example for photographic cameras, microscopes or copying apparatus.

We claim:

1. A variable focus optical system comprising: a forward lens unit and a rear lens unit, said forward lens unit having at least two lens groups, each of said lens groups being movable along the optical axis for varying the focal length of the optical system, and at least one of said lens groups being movable along the optical axis for focussing the optical system on an object located at a distance closer than the usual focal range of the optical system, first and second control means being selectively operable for varying the focal length of the optical system and comprising cam follower means, said first control means comprising first cam means cooperating with said cam follower means and controlling the movement of said lens groups according to a first law of motion wherein the image of an object located at said usual focal range remains in a constant image plane, said second control means comprising second cam means cooperating with said cam follower means and controlling the movement of at least one of said lens groups according to a second law of motion wherein the image of an object located at a distance closer than said usual focal range remains in said image plane, and said first and second cam means are formed on a common carrier structure.

2. An optical system as claimed in claim 1 wherein said first and second cam means are arranged in tandem on said carrier in relation to the scanning direction of said cam follower means on said cam means.

3. An optical system according to claim 1, wherein said second cam means is provided with a segment that focuses the system on a surface in the close-up range.

4. An optical system as claimed in claim 1 wherein said first and second cam means are arranged side-by-side on said carrier in relation to the scanning direction of said cam follower means on said cam means.

5. An optical system according to claim 4, wherein the first and second cam means are provided as a contact face of an aperture located in said common carrier, a single cam follower, and biasing means for said cam follower acting to engage said cam follower with the contact face of said aperture.

6. An optical system according to claim 1 including a releasable catch in the form of a by-pass locking device between the first and second control means so as to move the cam follower and/or the cam carrier.

7. An optical system according to claim 6 including a left-to-right dual switch having at least two positions forming a catch for moving the cam follower, said switch being disposed in the area of said arcuate cam arm.

8. An optical system according to claim 6, including a catch formed by the second control arc and located between the first and second control arcs at the first carrier, said catch being set in its working position between the first and second arcs at the second carrier.

9. A variable focus optical system comprising: a forward lens unit and a rear lens unit, said forward lens unit having at least two lens groups, each of said lens groups being movable along the optical axis for varying the focal length of the optical system, and at least one of said lens groups being movable along the optical axis for focussing the optical system on an object located at a distance closer than the usual focal range of the optical system, first and second control means being selectively operable for varying the focal length of the optical system, said first control means comprising first cam follower means cooperating with first cam means for controlling the movememnt of said lens groups according to a first law of motion wherein the image of an object located at said usual focal range remains in a constant image plane, said second control means comprising second cam follower means cooperating independently with at least second and third cam means for controlling the movement of at least one of said lens groups according to a second law of motion wherein the image of an object located at a distance closer than said usual focal range remains in said image plane, each of said at least second and third cam means defining a distinct distance closer than said usual focal range said first and at least second and third cam means being arranged on a common carrier structure, and actuating means for selectively engaging said second cam follower means with each of said at least second and third cam means.

10. A variable focus optical system comprising a forward lens unit and a rear lens unit, said forward lens unit having at least two lens groups, each of said lens groups being movable along the optical axis for varying the focal length of the optical system, and at least one of said lens groups being movable along the optical axis for focussing the optical system on an object located at a distance closer than the usual focal range of the optical system, first and second control means being selectively operable for varying the focal length of the optical system and comprising cam follower means, said control means comprising first cam means being arrange as a contact face of an aperture in a first carrier means, for being rigidly scanned by said cam follower, said first cam means controlling the movement of said lens groups according to a first law of motion at which the image of an object located at said usual focal range remains in a constant image plane, said second control means comprising second cam means for being rigidly scanned by said cam follower means and being arranged on second carrier means, said second carrier means controlling the movement of at least one of said lens groups according to a second law of motion at which the image of an object located at a distance closer than said usual focal range remains in said image plane, and biasing means acting on said first and second control means whereby said cam follower is arranged to be switched from rigidly scanning the first cam to rigidly scanning the second cam by changing the direction of the force of said biasing means.

11. An optical system according to claim 10, wherein the aperture of the first carrier is bounded by a first arc and second arc, at least one arc mounted on said second carrier being arranged to touch the cam follower in the area between arcs of said aperture in the working position of the second carrier.

12. An optical system according to claim 10, wherein the aperture in the first cam carrier is bounded by two or more arcs and wherein the second cam carrier is provided with an aperture wider than that of the first cam carrier, said aperture on said second cam carrier being bounded by control arcs associated with the first cam carrier, said second cam carrier having switching positions corresponding to the number of control arcs of an aperture, each of said switching positions comprising interlockingly fitted shaft running through the mutually associated arcs of both cam carriers for said cam follower.

13. An optical system according to claim 10 including a releasable catch in the form of a by-pass locking device is provided at least between one of the first and second control arcs so as to move the cam follower and/or the cam carrier.

14. An optical system according to claim 13 including a left-to-right dual switch having at least two positions forming a catch for moving the cam follower, said switch being disposed in the area of said arcuate cam arm.

15. An optical system according to claim 13, including a catch formed by the second control arc and located between the first and second control arcs at the first carrier, said catch being set in its working position between the first and second arcs at the second carier.

16. A variable focus optical system comprising a forward lens unit and a rear lens unit, said forward lens unit having at least two lens groups, each of said lens groups being movable along the optical axis for varying the focal length of the optical system, and at least one of said lens groups being movable along the optical axis for focussing the optical system on an object located at a distance closer than the usual focal range of the optical system, first and second control means being selectively operable for varying the focal length of the optical system and comprising cam follower means, said first control means comprising first cam means cooperating with said cam follower means and controlling the movement of said lens groups according to a first law of motion at which the image of an object located at said usual focal range remains in a constant image plan, said second control means comprising second cam means cooperating with said cam follower means, coupling means mounted on said system and adapted for having an attachment means inserted therein for defining a plane located at a distance closer than said usual focal range, said coupling means being arranged in front of said forward lens unit, said second cam means controlling the movement of at least one of said lens groups according to a second law of motion at which the image of an object located at said distance closer than said usual focal range remains in said image plane, sensing means for controlling an operative condition of said second control menas in response to the existence of said attachment means inserted into said coupling means.

17. An optical system according to claim 16 wherein said second cam means includes at least two second control arcs for different photographic distances, a punch key for controlling the scanning of said arcs, said punch key being located opposite the area of the attachments for the units that are especially adapted to the object and image planes as defined by said attachment means.

18. A variable focus optical system comprising a forward lens unit and a rear lens unit, said forward lens unit having at least two lens groups, each of said lens groups being movable along the optical axis for varying the focal length of the optical system, and at least one of said lens groups being movable along the optical axis for focussing the optical system on an object located at a distance closer than the usual focal range of the optical system, first and second control means being selectively operable for varying the focal length of the optical system and comprising cam follower means, said first control means comprising first cam means for at least a first part of the travel of said cam follower means and controlling the movement of said lens groups according to a first law of motion at which the image of an object located at said usual focal range remains in a constant image plane, said second control means comprising second cam means for at least a second part of the travel of said cam follower means, coupling means mounted on said system for coupling thereto an attachment means defining a plane located at a distance closer than said usual focal range, said coupling means being arranged in front of said forward lens unit, said second cam means controlling the movement of at least one of said lens groups according to a second law of motion at which the image of an object located at said distance closer than said usual focal range remains in said image plane, and locking means for preventing an insertion of said attachment means into said coupling means, said locking means having an inoperative position in an operative condition of said second control means.

19. An optical system according to claim 18 wherein said second cam means includes at least two second control arcs for different photographic distances, a punch key means for controlling the locking means, said key punch means being located opposite the area of the attachments for the units that are especially adapted to the object and image planes as defined by said attachment means.

20. A variable focus optical system in combination with a negative front lens attachment, said negative front lens attachment defining a focal plane at a distance closer than the usual focal range of the optical system, the optical system consisting of a forward lens unit and a rear lens unit, said forward lens unit having at least two lens groups, each of said lens groups being movable along the optical axis for varying the focal length of the optical system and at least one of said lens groups being movable along the optical axis for focussing the optical system on an object located at said distance at which the focal plane of said front lens attachment is located, first and second control means being selectively operable for varying the focal length of the optical system and comprising cam follower means, said first control means comprising first cam means cooperating with said cam follower means for at least a first part of travel of said cam follower means and controlling the movement of said lens groups according to a first law of motion at which the image of an object located at said usual focal range remains in a constant image plane, said second control means comprising second cam means cooperating with said cam follower means for at least a second part of travel of said cam follower means and controlling the movement of at least one of said lens groups according to a second law of motion at which the image of an object located at said focal plane of said front lens attachment remains in said image plane.

* * * * *